United States Patent
Eckard et al.

(10) Patent No.: US 9,530,053 B2
(45) Date of Patent: Dec. 27, 2016

(54) METHOD AND APPARATUS FOR DETECTING OR CHECKING AN ARRANGEMENT OF LABORATORY ARTICLES ON A WORK AREA OF A LABORATORY WORK STATION

(71) Applicant: TECAN TRADING AG, Mannedorf (CH)

(72) Inventors: Simon M. Eckard, Regensdorf (CH); Nikolaus Ingenhoven, Uerikon (CH)

(73) Assignee: Tecan Trading AG, Mannedorf (CH)

( * ) Notice: Subject to any disclaimer, the term of this patent is extended or adjusted under 35 U.S.C. 154(b) by 512 days.

(21) Appl. No.: 13/954,158

(22) Filed: Jul. 30, 2013

(65) Prior Publication Data

US 2014/0036070 A1    Feb. 6, 2014

Related U.S. Application Data

(60) Provisional application No. 61/677,713, filed on Jul. 31, 2012.

(51) Int. Cl.
  *G06K 9/62*  (2006.01)
  *G06K 9/00*  (2006.01)
  *G06T 7/00*  (2006.01)

(52) U.S. Cl.
  CPC ......... *G06K 9/00624* (2013.01); *G06T 7/0044* (2013.01); *G06T 2207/20104* (2013.01)

(58) Field of Classification Search
  CPC .......................... G06Q 10/08; G06K 9/00624
  (Continued)

(56) References Cited

U.S. PATENT DOCUMENTS

2006/0088928 A1*  4/2006  Sweet ............... G01N 1/312
                                                435/286.4
2007/0100713 A1*  5/2007  Del Favero ........ G06Q 10/087
                                                705/29

(Continued)

FOREIGN PATENT DOCUMENTS

EP      1733239      12/2006
FR      2 950 995    4/2011
(Continued)

OTHER PUBLICATIONS

Dutta, Soumya, and Bidyut B. Chaudhuri. "A color edge detection algorithm in RGB color space." Advances in Recent Technologies in Communication and Computing, 2009. ARTCom'09. International Conference on. IEEE, 2009.*

*Primary Examiner* — Allen Wong
*Assistant Examiner* — Clifford Hilaire
(74) *Attorney, Agent, or Firm* — Notaro, Michalos & Zaccaria PC (57) ABSTRACT

A method of detecting an original arrangement of laboratory articles of a laboratory work station records reference digital images with a digital camera. An image is displayed and visible regions with characteristic features are selected by a user within an input device. Reference image sections and corresponding reference image parameter files are produced and stored. A current arrangement of laboratory articles is compared with a previously recorded original arrangement. Detection of the current arrangement occurred by recording current digital images with a digital camera and creating current image sections defined by X/Y parameters of the reference image parameter files from the current digital images. A computer-based comparison of the processed current image sections with the processed reference image (Continued)

sections occurred and an analysis of this comparison and the display of agreements, deviations and errors is found.

21 Claims, 6 Drawing Sheets

(58) Field of Classification Search
USPC .......................................... 435/283.1; 705/29
See application file for complete search history.

(56) References Cited

U.S. PATENT DOCUMENTS

| | | | | |
|---|---|---|---|---|
| 2007/0198375 A1* | 8/2007 | Aptekar | ................ | G06Q 10/08 705/29 |
| 2009/0060349 A1* | 3/2009 | Linaker | .............. | G06K 9/00664 382/209 |
| 2010/0171826 A1* | 7/2010 | Hamilton | ............... | G06Q 30/06 348/135 |

FOREIGN PATENT DOCUMENTS

| | | |
|---|---|---|
| JP | 2007303885 | 11/2007 |
| WO | WO 2005/098455 | 10/2005 |

* cited by examiner

METHOD AND APPARATUS FOR DETECTING OR CHECKING AN ARRANGEMENT OF LABORATORY ARTICLES ON A WORK AREA OF A LABORATORY WORK STATION

RELATED PATENT APPLICATIONS

This US application claims priority of the U.S. provisional application No. 61/677,713 of Jul. 31, 2012, the entire content of which is herein incorporated by reference.

RELATED TECHNICAL AREA

The invention relates to a method and a corresponding apparatus for detecting or checking an arrangement of laboratory articles on a work area of a laboratory work station. Such laboratory work stations are known and comprise, for example, a working surface or at least one work area for placement of laboratory articles such as, for example, containers in the form of microplates and sample tubes, supports or so-called "carriers" for receiving such containers or for example, pipette tips or pipette tip magazines. These laboratory work stations preferably comprise a motorized robot or robot arm which can be fitted with grippers for gripping the laboratory article and/or with pipettes for receiving and delivering liquid samples. Specially preferred are those laboratory work stations which additionally comprise a processor or computer for controlling the movements of the motorized robot or robot arm and preferably also other parameters of the laboratory work stations. Laboratory work stations whose working surface or work areas are disposed substantially horizontally are preferred. Preferably a robot or robot arm configured as a pipetting robot comprises at least one pipette for receiving (aspirating) and delivering (dispensing) liquid samples. Usually the controller of the laboratory work station is connected to the robot or robot arm and equipped with a corresponding software in such a manner that the processor causes the robot or robot arm to position a working tool such as a pipette or a gripper at determinable locations on the at least one work area and execute selected work there. Such laboratory work stations are known per se and are manufactured and distributed by the current applicant under the trade name Freedom EVO®.

A common feature of such laboratory work stations or systems is that samples are frequently processed in standardized microplates. Such microplates have been described and standardized by the American National Standards Institute (ANSI) and by the Society for Biomolecular Sciences (SBS). These microplates are available in all possible formats but typically comprise 96-sample vessels or wells which are arranged in a regular 8×12 grid with a 9 mm axial spacing. Microplates having a multiple (e.g. 384 or 1536) or only a part (e.g. 48 or 24) of this number of wells or density are also used.

For example, one or more robots moving in accordance with a Cartesian coordinate system or a polar coordinate system can be used for working on a rectangular or round work area of a laboratory work station. These robots can carry plates or other sample containers and also transfer liquids. A central control system or a computer monitors and controls these known laboratory systems whose exceptional advantage lies in the complete automation of the working processes. Consequently such laboratory systems can be operated for hours and days without any human intervention being required.

RELATED PRIOR ART

Such automated laboratory systems, which are frequently also designated as "Robotic Sample Processors" (RSP), base the movements of their robot or robot arm typically on so-called dead reckoning. According to this conventional process, an image of the real situation (placement and orientation of laboratory articles on the work area) is generated with the system software. In this case, the movements of the robot arm towards specific objects or laboratory articles are calculated on the basis of the distances contained in the software model. Problems can arise as a result of the calculated movements being executed by the robot arm without taking into account a contradiction with the real situation, i.e. for example, a misplacement of a laboratory article or even leaving a tool lying. Quite obviously misplacements, for example, the positioning of a deepwell plate instead of a standard microplate, the incorrect alignment of a microplate or even the incorrect positioning of a microplate support or carrier can lead to inevitable process errors and costly collisions with apparatus (e.g. pipettes) fastened to the robot arm. Worse still, diagnostic results possibly achieved in wrongly oriented microplates could lead to incorrect assignments of the corresponding diagnoses. There is therefore a need in the most diverse branches of automated laboratory technology, regardless of whether this be pharmaceutical research, clinical diagnostics or even the production of such products, for a method for detecting the arrangement of objects on laboratory devices. In addition, this requirement relates to a method for checking the arrangement of laboratory articles on a work area of a laboratory work station.

Known from the Patent EP 1 733 239 B1 are a laboratory system and a corresponding method for identifying and locating laboratory articles on the surface of the laboratory work table based on the use of radio frequency identification labels, so-called RFID tags. Thanks to the division of the laboratory work table by means of a virtual grid at the grid intersection points whereof transmitting and receiving elements for transmitting energy through the laboratory work table are disposed, the laboratory articles provided with RFID labels can be excited by means of an identifiable antenna and reliably identified and located by a computer connected to a central transmitter.

From the document US 2006/0088928 A1, there is known a method and apparatus for automatic staining of tissue samples. This apparatus comprises a control element for managing the staining process and a 2-D optical sensor for detecting two-dimensional image data of a relevant property of the tissue samples and for feeding the captured image data to the control element. By means of current images of parts of the staining apparatus, the status of the latter can be captured in that the optical sensor is utilized for automatic identification and checking of the current position of the tissue samples, tissue sample carriers, and reagent containers that are present at the staining apparatus. In consequence, the 2-D sensor can be used for self-calibration of the staining apparatus (e.g. following to executing maintenance or refurnishing work) in that the automat is comparing a current image with a stored image and thereby determines whether all critical components are mounted in the right place, are absent or only slightly misplaced.

OBJECT AND SUMMARY OF THE PRESENT INVENTION

It is the object of the present invention to provide an alternative method and a corresponding apparatus for detecting or checking an arrangement of laboratory articles on a work area of a laboratory work station. This object is solved according to a first aspect by a detection method as herein disclosed and according to a second aspect by a checking method as herein disclosed. The object is solved according to a third aspect by a laboratory work station for carrying out this method as herein disclosed. Further preferred features according to the invention are obtained from the respective dependent claims.

Advantages of the Present Invention with Respect to the Prior Art

When automatically evaluating the current status located as known, a computer compares an actual image with a target image (cf. US 2006/0088928 A1), which requires sophisticated software with rather complex algorithms in order to only achieve a reasonable assessment. According to the invention however, the difficult part, i.e. the recognition and selection of particularly assertive orientation attributes (so to speak, the image evaluation) is carried out by the user. The computer (being external or of the laboratory work station) subsequently takes up the easier work of comparing the image information that—in accordance with the present invention—already has been selected by the user, whereupon a highly reliable assessment is assured.

When automatically evaluating the current status according to US 2006/0088928 A1, critical parts are uniquely identified during initiation of the device for self-calibration of the apparatus; however, there is no disclosure of the character of the identification. In contrast and according to the present invention, detailed utilization of an interactive user interface and thus a dynamic method is provided that can be applied in different situations of a process sequence and in arbitrary environments. When applying the method of the current invention, at least two newly defined images of arbitrary work area regions that however are selected by the user in each case and that represent an actual image and a target image are compared with each other. In consequence and in addition to a calibration of the apparatus, arrangements of laboratory articles that are chosen during operation of the laboratory work station can be controlled and taken decisions checked.

BRIEF INTRODUCTION OF THE ATTACHED DRAWINGS

The method according to the invention and the laboratory work station according to the invention for detecting or checking the arrangement of laboratory articles on a work area of a laboratory work station are now explained in detail with reference to schematic drawings, where exemplary embodiments of the detecting or checking method and exemplary embodiments of the laboratory work station and its use are illustrated without wishing to restrict the scope of the present invention. In the figures:

FIG. 4 shows a digital processing of a reference image section selected from FIG. 2, wherein:

DETAILED DESCRIPTION OF THE PRESENT INVENTION

Figure 1:
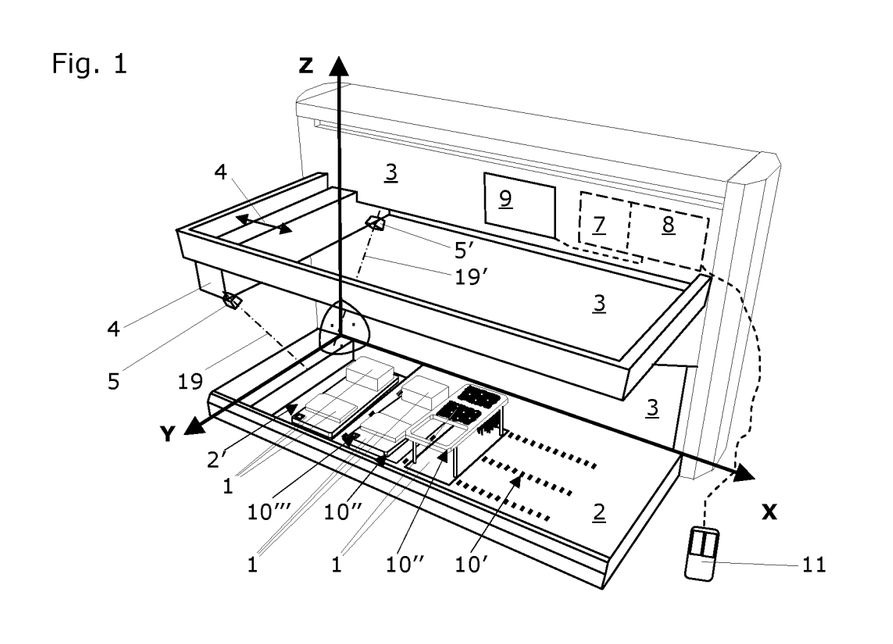
FIG. 1 shows a laboratory work station used for carrying out the method according to the invention comprising at least one work area and a robot arm used as a support apparatus on which one or two digital cameras are fastened.

For carrying out the method according to the invention for detecting the arrangement of laboratory articles 1 on a work area 2 of a laboratory work station 3, it is provided that at least one support apparatus 4 is disposed above the work area 2 of the laboratory work station 3. FIG. 1 shows a laboratory work station 3 used for carrying out the method according to the invention comprising at least one work area 2 and comprising a robot arm used as support apparatus 4 (here movable in the X direction, see double arrow) on which one or two digital cameras 5,5' are fastened. In fact, two work areas 2,2' are shown here where the first work area 2 can be considered as a work table or sub-region of a work table. The second work area 2' is lowered here compared with the first work area 2 and extends preferably substantially parallel to the first work area 2 and horizontally. Unlike the diagram in FIG. 1, the second work area 2' can be located above the first work area 2 (not shown).

As shown, laboratory articles 1 or, for example, equipment for processing or analyzing the samples in microplates (such as, for example, centrifuges, incubators, washers, readers etc.) can also be placed on the second work area. In a simpler embodiment only or two digital cameras 5,5' can be mounted in a fixed position, non-displaceably (not shown). As a further alternative, it can be provided that the original arrangement of laboratory articles 1 on the work area 2 of the laboratory work station 3 is detected by means of two digital cameras 5,5', where these digital cameras 5 are fastened to two different support apparatuses 4,4' disposed at a distance from one another (not shown). The scope of the present invention includes the most diverse support apparatuses 4, 4' which are movable or displaceable, e.g. as robot arms, carriages or sleds, but which can also be configured to be stationary, for example a fastening angles, screws or the like.

After one laboratory work station 3 and it's at least one work area 2 have been equipped with laboratory articles and constructed (and at best used or tested), the detection method according to the invention can be applied.

The detection method according to the invention comprises the detection of an original arrangement of laboratory articles 1 on the work area 2 of the laboratory work station 3 by means of at least one reference digital image 6, where the reference digital images 6 are recorded with at least one digital camera 5 fastened to the support apparatus 4 in a defined position and alignment.

Preferably, for detecting the original arrangement of laboratory articles 1 on the work area 2 of the laboratory work station 3, the at least one support apparatus 4 with one or two digital cameras 5,5' fastened thereon is moved to at least two receiving locations where at each of these receiving locations a reference digital image 6 is recorded with each of these digital cameras 5,5'.

The movement of the digital cameras 5,5' to the receiving locations and the recording of the digital images 6 at the receiving location is controlled according to a preferred embodiment of software of the laboratory work station 3. According to a preferred first alternative embodiment, the detection method is controlled by a computer program which can be activated in a separate computer 8' for carrying out the method for detecting the arrangement of laboratory articles 1 on the work area 2 of the laboratory work station 3. According to a preferred second alternative embodiment, the detection method is controlled by software of the laboratory work station 3 where the laboratory work station 3 preferably also comprises the first and second memories 7, 7', the processor 8, the screen 9 and the input device 11. Instead of a screen 9, any other device suitable for displaying images, i.e. an image display device 9 such as, for example, a projector can be used, which is operatively connected to the processor 8.

Generally a device is designated as "operatively connected" to another device if electrical pulses, energy, electromagnetic waves, information or data can be exchanged between these two device according to their determination via a cable connection or via a cableless connection (such as, for example, by means of WiFi or Bluetooth).

Images are recorded according to the selected test structure by means of specific software for the laboratory work station 3 used which is designed to start an activated camera control program. After each position change, the digital cameras 5,5' are triggered in a stepwise manner.

Almost all cameras 5,5' comprising an imaging sensor having a resolution of at least 320×240 pixels, preferably at least 640×480 pixels are suitable for use as digital cameras in this method. Preferred are digital cameras which are configured for automatic regulation of focus, white balance, exposure and contrast. In one experimental setup one or two C310 USB webcams from Logitech (Logitech Schweiz AG, CH-8048 Zürich) having the following dimensions: length=80 mm, width=20 mm, height=12 mm were used. The imaging sensor of this camera has a resolution of 640×480 pixels and records color images; the white balance, exposure and contrast are automatically regulated in these cameras. Unlike the embodiments presented here, instead of one or two digital cameras or webcams, one or two analogue cameras or video cameras can also be used. In these few preferred embodiments analogue reference images initially accumulated must firstly be additionally digitized in any case to achieve appropriate results.

The camera 5 mounted at the front (or its optic axis 19) is here inclined at an angle of 45° to the vertical (Z direction) and overviews the front area of the work area 2 as far as the second microplate position of the microplate carrier 1 designed to hold three microplates. The first position of the imaged microplate carrier (in the position having a lower X value) is occupied by a microplate having a very low overall height and the third position is occupied by a microplate having a high overall height; the second position of the microplate carrier is not occupied here. The second position of the imaged pipette tip rack (in the position having higher X value) is equipped with disposable pipettes having a large volume; the first position of the pipette tip rack is not occupied here.

The rear camera 5' (or its optic axis 19') is inclined with respect to the vertical by 60° and overviews the rear part of the work area 2 likewise as far as the second microplate position of the microplate carrier 1. The rear camera 5' is offset by about 2.5 cm in the positive X direction with respect to the front camera 5. Both digital cameras 5,5' record images in portrait mode where the image longitudinal side runs parallel to the Y direction of the Cartesian coordinate system of the laboratory work station 3. The image transmission to a processor 8,8' is accomplished by means of two commercially usual USB cables (not shown in FIG. 1 for the sake of clarity). The power consumption of the two webcams 5,5' is so low that they can be operated at the same time in video mode on the same passive USB hub.

The detection method according to the invention further comprises the storage of this at least one reference digital image 6 in a first memory 7 of a processor 8,8' operatively connected to the digital camera 5 and the display of this at least one reference digital image 6 on a screen or image display device 9 operatively connected to the processor 8,8'. Preferably a random access memory (RAM) of a processor 8,8' is used as first memory 7. Alternatively to this, this at least one reference digital image 6 can also be stored elsewhere, e.g. on an internal or external hard drive (hard disc drive=HDD). The central computer 8 of a laboratory work station 3 (RSP) or a separate processor 8' can be used as the processor.

The detection method according to the invention further comprise the marking and producing of reference image sections 12 having characteristic visible features 10 on the at least one reference digital image 6 which are selected from the group consisting of features of the work area 10', features of the laboratory article 10" and additional markings 10'''. For this purpose, the at least one reference digital image 6 (but preferably a plurality of reference digital images 6 which were combined to at least one strip image) is presented to the user on the screen or image display device 9, preferably with the request to mark relatively small, distinctive places which are important for the sequence of planned tests as reference image sections 12.

The user now selects regions on the work area 2 of the laboratory work station 3 with characteristic features 10 that are visible on the at least one reference digital image 6. These features 10 are selected from a group that consists of features of the work area 10', features of the laboratory articles 10", and features of additionally applied markings 10'". The selection is optically performed at the screen or with the help of an image display device 9. At least one input device 11 operatively connected to the processor 8,8' is used for marking these reference image sections 12. Features of the work area are typically locations having high contrast such as, for example, edges defining planes, holes in planes, upright burrs, screw heads, inscriptions and the like. Features of the laboratory articles 10" are typically edges defining planes, recesses or elevations in planes, upright burrs, inscriptions and the like. Additional markings 10'" are typically lines, surfaces, areas, logos, inscriptions and the like which, for example are printed on self-adhesive labels. All computer peripheral devices such as keypads, mice, touchscreens, graphic user interfaces (GUI), smartphones and the like are designated as input devices 11, which are configured for inputting information into a computer or which can be used for this purpose. These input devices 11 can be connected, as shown, by means of a cable or in a cableless manner (e.g. by means of Bluetooth or WiFi connection; not shown) to the processor 8,8'.

According to an exemplary detection method tested in practice, the user draws rectangles indicated on the screen and preferably adapted in their size around these features 10',10",10'" with a computer mouse 11 and he confirms the selection with left mouse click or by pressing any previously appointed key, e.g. the enter button, on a computer keyboard. The computer program for implementing the detection method gives the user a confirmatory acknowledgement for the executed marking by means of a color change of the rectangles (cf. FIG. 2). If the user has marked all the desired features 10',10",10'", he leaves the currently active detection dialogue with a right mouse click or by pressing the ESC button on the computer keyboard. It can be provided to implement the cancellation of wrongly set regions in the computer program according to the invention.

Figure 2:
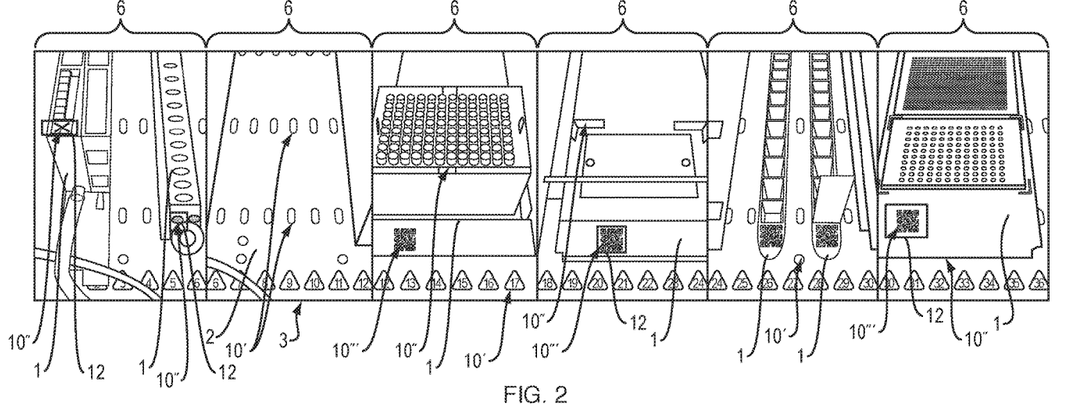
FIG. 2 shows a first learning step of the detection method according to the invention in which a digital camera is used in order to detect the original arrangement of laboratory articles constructed as prescribed on the work area of the laboratory work station.

FIG. 2 shows a first learning step of a detection method according to the invention in which the front digital camera 5 was used to detect the original arrangement of laboratory articles 1 constructed as prescribed on the work area 3 of the laboratory work station 3. A strip image which has been composed from six reference digital images 6 is shown.

In order to ensure that the robot arm 4 of the laboratory work station 3 has been installed correctly, it can be provided that a static invariable element of the work area 2 must be marked as the first marked region or reference image section 12 such as, for example, the corner of a fixedly mounted washing station (cf. feature 10" in the first reference digital image 6, far left in FIG. 2), a specific grid index (cf. feature 10' in the third reference digital image 6, roughly at the center of FIG. 2) or one of the black pimples which define an insertion slot on the work area 2 (cf. feature 10' in the second reference digital image 6 from FIG. 2). This initialization enables the identification of any offset between the robot arm 4 and the work area 2.

Preferably the marked additional features 10'" on the work area 2 of the laboratory work station 3 or on the laboratory articles 1 are provided by means of a method selected from the group comprising printing, injection molding, overcooling, adhesive bonding, welding and soldering, wherein these additional features 10'" are configured as company logo, 1D barcode, 2D barcode, 3D barcode, QR code, graphical element or marking.

Figure 3:
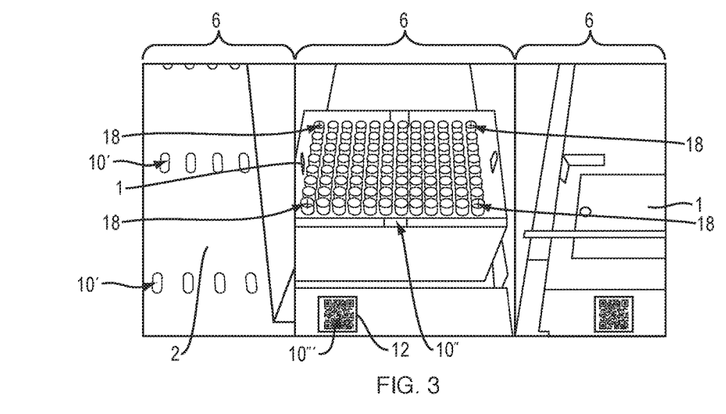
FIG. 3 shows a second learning step of the detection method according to the invention in which the four disposable pipette tips to be located in the corner position are marked by a cross hair on the image from FIG. 2.

FIG. 3 shows a second learning step of the detection method according to the invention in which the four disposable pipette tips to be located in the corner position are marked with a cross hair 18 on the image in FIG. 2. All 96 pipette tips are present on this reference digital image 6.

Optionally in a subsequent step, more complex markings can be made as required i.e. higher functions of the computer program can be retrieved for implementing the detection method. As an example, the detection of missing disposable pipette tips is implemented (cf. FIG. 3). For this purpose, a rack containing disposable pipette tips is marked at the four corners so that the four most exposed of the 96 disposable pipette tips were provided with a cross hair 18. In this case, the marking was made with a single mouse click. This more complex dialogue was left by pressing the ESC button on the computer keyboard.

The detection method according to the invention further comprises the generation of at least one reference image parameter file 13 for the previously produced reference image sections 12. Such a reference image parameter file 13 preferably comprises an event number, X coordinates (width) and Y coordinates (height) of the reference image sections 12 (in pixels) or in other words the X/Y parameter of the corresponding reference image sections 12. Alternatively such a reference image parameter file 13 preferably comprises, in addition to the event number, the angle and the distance from the center of the reference image sections 12 (in pixels) or in other words the polar coordinates of the corresponding reference image sections 12.

The detection method according to the invention further comprises the storage of the previously produced reference image sections 12 and the previously produced reference image parameter file(s) 13 in a second memory 7'. Preferably in cases in which a plurality of reference digital images 6 are required to detect a current arrangement of laboratory articles 1 on the work area 2 of a laboratory work station 3, the reference digital images 6 are combined to form a complete reference image 15. Consequently the previously produced complete reference image 15 and the previously produced reference image parameter file(s) 13 are stored in a second memory 7'. A less preferred alternative comprises storing the previously produced complete reference image 15 and the previously produced reference image parameter file(s) 13 in the random access memory (RAM) which can therefore alternatively be designated as first and second memory 7, 7'.

Preferably and optionally the exposure of the recorded reference digital images 6 or the complete reference image 15 is checked automatically. In the case of any over- or underexposure (the respective threshold value thereof is preferably pre-determined) of the reference digital images 6 or the complete reference image 15, one of the following alternative steps is preferable executed:

the user is requested, or
an instruction is issued to a controller, or
command is issued automatically to a controller to detect again the original arrangement of laboratory articles 1 on the work area 2 of the laboratory work station 3. In this case, it is preferred that in the first case the user can give a corresponding command to the controller, in the second case can confirm the instruction and in the third case provides information about the process already carried out.

Preferably a random access memory on an internal or external hard drive (hard disc drive=HDD) of a processor 8,8' is used as the second memory. Alternatively to this, these previously produced reference image sections 12 and reference image parameter file(s) 13 could also be stored elsewhere, e.g. in a random access memory (RAM). A central computer 8 of a laboratory work station (RSP) or a separate processor 8' can be used as the processor. In any case, a more or less mobile processor such as a PC, laptop, netbook and the like but also a fixed stationary large computer such as, for example, a central computer in a computing center is designated as separate processor 8'. The data transmission between the separate processor 8' and the laboratory work station 3 can be cable-based or cableless.

Figure 4A:
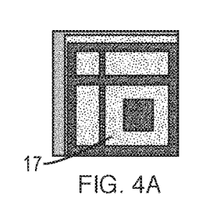
FIG. 4A shows the reference image section selected from FIG. 2.

FIG. 4 shows a digital processing of a reference image section 12 selected from FIG. 2 where FIG. 4A shows the reference image section 12 selected from FIG. 2 as a grey-scale image 17. Such a grey-scale image is at least subject to a derivation operation in the x or y direction (Sobel operator) and the resulting grayscale images added in order to obtain the edge information weighted by intensity which is significantly more independent of illumination that the actual color information of the original reference image sections 12 (cf. FIG. 2).

Figure 4B:
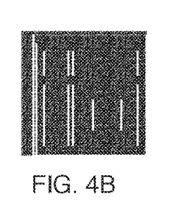
FIG. 4B shows a grey scale image of the selected reference image section according to a first derivative of x.
Figure 4C:
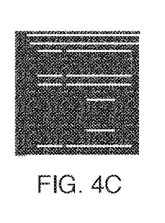
FIG. 4C shows a grey scale image of the selected reference image section according to a first derivative of y.
Figure 4D:
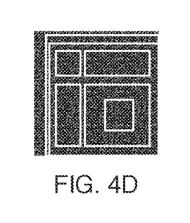
FIG. 4D shows a scaled reference sum image of the two images from FIGS. 4B and 4C.

FIG. 4B shows a grey-scale image of the selected reference image section 12 after taking a first derivative with respect to x, hence substantially perpendicularly running edges have a white "shadow". FIG. 4C shows a grey-scale image of the selected reference image section 12 after taking a first derivative with respect to y, hence substantially horizontally running edges have a white "shadow". FIG. 4D shows a scaled reference sum image of the two images from FIGS. 4B and 4C.

Preferably the produced reference image sections 12 or the produced complete reference image 15 are stored unprocessed or processed together with the respectively corresponding reference image parameter files 13 in the second memory 7', where the optional image processing involves extracting position information with high contrast. Image processing can be executed not only on grey-scale images but also on images of the red, green or blue channel of a color image. In addition, derivatives of the individual images can be taken not only in the x or y direction but also in directions which deviate from the x or y direction by a certain angle.

Figure 5:
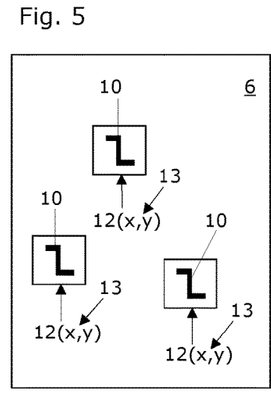
FIG. 5 shows a schematic diagram of the result of detecting an original arrangement of laboratory articles on a work area of a laboratory work station.

FIG. 5 shows an exemplary schematic view of the result of the detection of the original arrangement of laboratory articles 1 on a work area 2 of a laboratory work station 3. As an example for a characteristic feature 10, a Z-shaped figure or structure was selected here. On this single reference digital image 6 three reference image sections 12 are marked and the respectively corresponding reference image parameter file 13 is symbolized by the expression (x,y).

The present invention also comprises a method for checking the arrangement of laboratory articles 1 on a work area 2 of a laboratory work station 3, where a current arrangement of laboratory articles 1 is compared with an original arrangement of laboratory articles 1 on the work area 2 of this laboratory work station 3 detected previously. This checking method is characterized in that the method comprises producing unprocessed reference image sections 12 or processed reference image sections 12' or producing an unprocessed complete reference image 15 or a processed complete reference image 15' and respectively corresponding reference image parameter files 13 for the original arrangement of laboratory articles 1 on the work area 2 of this laboratory work station 3.

The checking method preferably comprises detecting a current arrangement of laboratory articles 1 on the work area 2 of the laboratory work station 3 by means of at least one current digital image 6', wherein the current digital images 6' are recorded with the at least one digital camera 5,5' fastened to the support apparatus 4 in a defined position and alignment. Similarly to the detection method, the work area 2 of the laboratory work station 3 is again photographed at the same distances and the at least one current digital image 6' is stored in the first memory 7 (e.g. in the RAM) of the processor 8,8' operatively connected to the at least one digital camera 5,5'.

The checking method additionally comprises loading the processed reference image sections 12' or the processed complete reference image 15' as well as loading the corresponding reference image parameter files 13 from the second memory 7' (e.g. from the HDD) into the first memory 7 of the processor 8,8' and creating the current image sections 14 from the current digital images 6', wherein these current image sections 14 are defined by X/Y parameters or by polar coordinates of the reference image parameter files 13.

The checking method additionally comprises processing the current image sections 14 according to the processed reference image sections 12'. In this case, the image processing can again be performed not only on grey-scale images but also on images of the red, green or blue channel of a color image. In addition, derivatives of the individual images can be taken not only in the x or y direction but also in directions which deviate from the x or y direction by a certain angle. The processed current image sections 14' are then stored in the first memory 7 (e.g. in the RAM) of the processor 8,8'.

Preferably and optionally the exposure of the recorded current digital images 6' is checked automatically. In the case of any over- or underexposure (the respective threshold value thereof is preferably pre-determined) of the current digital images 6', one of the following alternative steps is preferably executed:
 the user is requested, or
 an instruction is issued to a controller, or
 command is issued automatically to a controller
to detect again the original arrangement of laboratory articles 1 on the work area 2 of the laboratory work station 3. In this case, it is preferred that in the first case the user can give a corresponding command to the controller, in the second case can confirm the instruction and in the third case provides information about the process already carried out.

Figure 6:
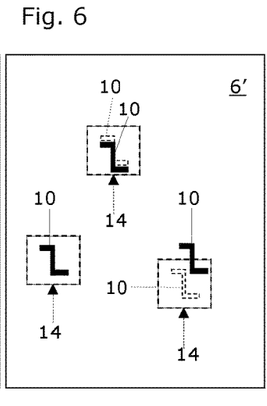
FIG. 6 shows a schematic diagram of the creation of current image sections from the current digital images, where these current image sections are defined by X/Y parameters of the reference image parameter files.

FIG. 6 shows a schematic view of the creation of current image sections 14 from the current digital images 6', where these current image sections 14 are defined by the previously stored X/Y parameters of the reference image parameter files 13. The characteristic features 10 selected previously as an example (cf. FIG. 5) with the Z-shaped figure or structure are reproduced by dashed lines here:
 the current image section 14 detects the entire feature 10 bottom left in a position which agrees perfectly with the original position of this feature. This labware 1 has the correct feature 10 and is identified as correct, in addition it is located at the correct location.
 the current image section 14 detects the entire feature 10 top center in a position which does not quite agree with the original position of this feature. This labware 1 has the correct feature 10 and is identified as correct, but it is not located at the correct location, an offset in the Y direction is indicated, a corresponding alarm is triggered.
 the current image section 14 does not detect the entire feature 10 bottom right in a position which does not agree with the original position of this feature. This labware 1 is not identified because it does not have the correct feature 10, a corresponding alarm is triggered.

Figure 7:
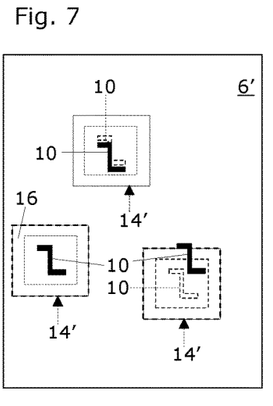
FIG. 7 shows a schematic diagram of an alternative creation of current image sections from the current digital images, where these current image sections are defined by X/Y parameters of the reference image parameter files, where in addition to the current image sections from the current digital images defined by the X/Y parameters of the reference image parameter files, a buffer zone surrounding these current image sections is additionally added.

FIG. 7 shows a schematic diagram of an alternative creation of current image sections 14' from the current digital images 6', where these current image sections 14' are defined by X/Y parameters of the reference image parameter files and where, in addition to current image sections 14 from the current digital images 6' defined by the X/Y parameters of the reference image parameter files 13, a buffer zone 16 surrounding these current image sections 14 (cf. FIG. 6) is added. Preferably when creating the current image sections 14 from the recorded current digital images 6' defined by the X/Y parameters of the reference image parameter files 13, a buffer zone 16 having a constant width of, for example 10 pixels, surrounding these current image sections 14 is added. This width of the buffer zone 16 is matched to the image edges (widened or narrowed).

The checking method preferably comprises that the current image sections 14' processed in step l) with or without buffer zone 16 are compared with the processed reference image sections 12' in the processor 8,8' by searching for the corresponding processed reference image section 12' within each processed current image section 14' with or without buffer zone 16.

The checking method preferably comprises that for each feature 10',10",10''' it is determined by means of result values whether in relation to image content and position of the features 10',10",10''' agreement exists between the current arrangement of laboratory articles 1 and the original arrangement of laboratory articles 1 on the work area 2 of the laboratory work station 3. In this case, these result values preferably comprise an image content component, a spatial component in the X direction and a spatial component in a Y direction. In addition it is preferred that the agreement of each of these at least three components is determined in relation to respectively one corresponding threshold value.

It is especially preferred in the checking method according to the invention that each perfect agreement is displayed as an individual green field [or field of a first color] assigned to the corresponding current image section 14 and each satisfactory agreement is displayed as an individual orange field [or field of a second color] assigned to the corresponding current image section 14 on the screen or with the image display device 9. In addition, it is especially preferred that each error is displayed as an alarm, wherein the alarm is selected from a group consisting of a visual alarm (e.g. in the form of a flashing lamp, an icon, an individual red field [or field of a third color] assigned to the current image section 12 or warning window on the screen), an audible alarm (in the form of a siren, a gong, a bell), an alarm message (e.g. by e-mail, by SMS, as computer protocol) and a mechanical blocking of the laboratory work station 3.

Figure 8:
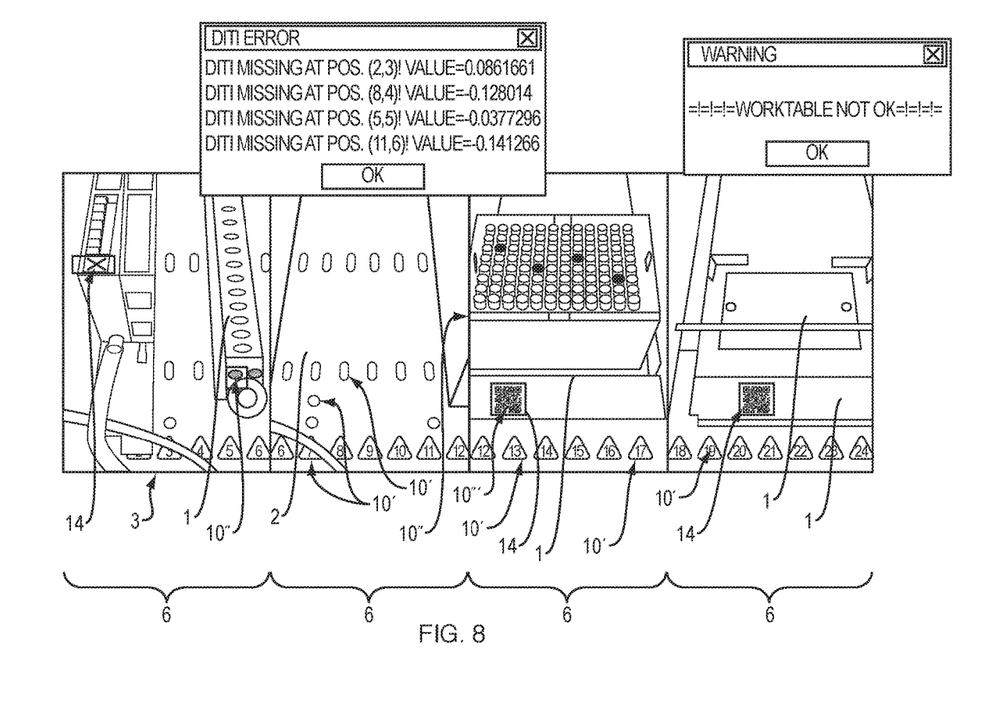
FIG. 8 shows the result of checking the arrangement of laboratory articles on a work area of a laboratory work station with indicated agreements and errors.

FIG. 8 shows the result of a check of the arrangement of laboratory articles 1 on a work area 2 of a laboratory work station with indicated agreements and errors. A strip image which has been composed of four reference digital images 6 is shown.

In the region of the first reference digital image 6 (from the left) a washing trough for washing pipette tips can be seen on the far left. The current image section 14 shows the correct feature at the correct location which is not surprising because the washing trough is screwed to the work area 2 and therefore is always in the correct place. This washing trough or its characteristic feature 10 can be used as a reference point for a direct initialization of the robot arm 4 or for checking an initialization which has already been made.

No laboratory articles are placed in the area of the second reference digital image 6 (from the left). Instead characteristic features of the work area 10' such as black pimples which define an insertion slot on the work area 2 are visible here.

In the area of the third reference digital image 6 (from the left) a carrier 1 with a rack of disposable pipette tips is visible in the first position. The current image section 14 shows the correct feature 10''' at the correct location so that the carrier 1 is correctly placed. However a total of 4 disposable pipette tips (disposable tips=DiTi) are missing which are displayed in an error window as "DiTi error". In addition, the places of these four missing pipette tips are marked with black-bordered (preferably: red-bordered) circular areas. In a preferred procedure in the presence of a parameter file for DiTi checking, the given area is copied with an edge and dewarped perspectively on the basis of the four input corner points. The resulting image is divided into 8×12 sub-regions. A similar procedure is adopted with the reference image parameter file produced by the learning program. Each of the 96 sub-regions is now checked for agreement with the sub-regions according to the reference image parameter file. Preferably no pre-processing by means of Sobel operators is made since this usually involves very dark images having few edges in which any deviation (=missing DiTi) can be seen primarily in the color/brightness information. If the deviation is too great (q<0.350; cf. below), a warning message with the position of the DiTis is given and the position is marked with a red circle [or circle of a third color], otherwise a green circle [or circle of a first color] is shown (cf. FIG. 3). In order to avoid false negative messages, preferably not the entire sub-region is considered but an edge region of 2-5 pixels is ignored since the influence of adjacent disposable pipette tips (DiTis) is greatest here.

In the region of the fourth reference digital image 6 (from the left) an empty microplate carrier 1 is visible. The current image section 14 certainly shows the correct feature (here a 2D barcode) but it is not completely located at the correct location so that the carrier is not correctly placed. In fact it is not completely inserted so that a "warning" is displayed in an error window.

The present invention comprises a laboratory work station 3 comprising at least one work area 2, which is in particular suitable for carrying out the method for detecting or checking the arrangement of laboratory articles 1 on this work area 2 of the laboratory work station 3. This laboratory work station 3 comprises:

n) at least one support apparatus 4 disposed above the work area 2 of the laboratory work station 3;
o) at least one digital camera 5,5' fastened to the support apparatus 4 in a defined position and alignment;
p) a processor 8 operatively connected to the at least one digital camera 5 with a first and second memory 7,7';
q) an image display device 9 operatively connected to the processor 8;
r) at least one input device 11 operatively connected to the processor 8; and
s) a computer program which can be activated in the processor 8 for carrying out the method for detecting or checking the arrangement of laboratory articles 1 on this work area 2 of this laboratory work station 3.

In a preferred laboratory work station 3, the work area 2 is defined in accordance with a Cartesian coordinate system by an X axis and a Y axis running at right angles thereto where the laboratory work station 3 comprises a Z axis running perpendicular to the work area 2. This preferred laboratory work station 3 is characterized in that the at least one support apparatus 4 with digital camera fastened thereon is configured to be linearly movable in the direction of the X axis or Y axis.

In an alternative laboratory work station 3, the work area 2 is defined according to a polar coordinate system by a center, an angle and a distance region in relation to this center (not shown). In addition, this alternative laboratory work station 3 can comprise a Z axis running perpendicular to the work area 2. This alternative laboratory work station 3 is characterized in that the at least one support apparatus 4 with the digital camera 5, 5' fastened thereon is configured to be movable in a circle around the center.

Alternatively it can also be provided that a support apparatus 4 is disposed on the laboratory work station 3, to which two digital cameras 5,5' are fastened at a distance from one another or that two support apparatuses 4 are disposed at a distance from one another on the laboratory work station 3, where one digital camera 5 is fastened to each support apparatus 4.

Figure 9:
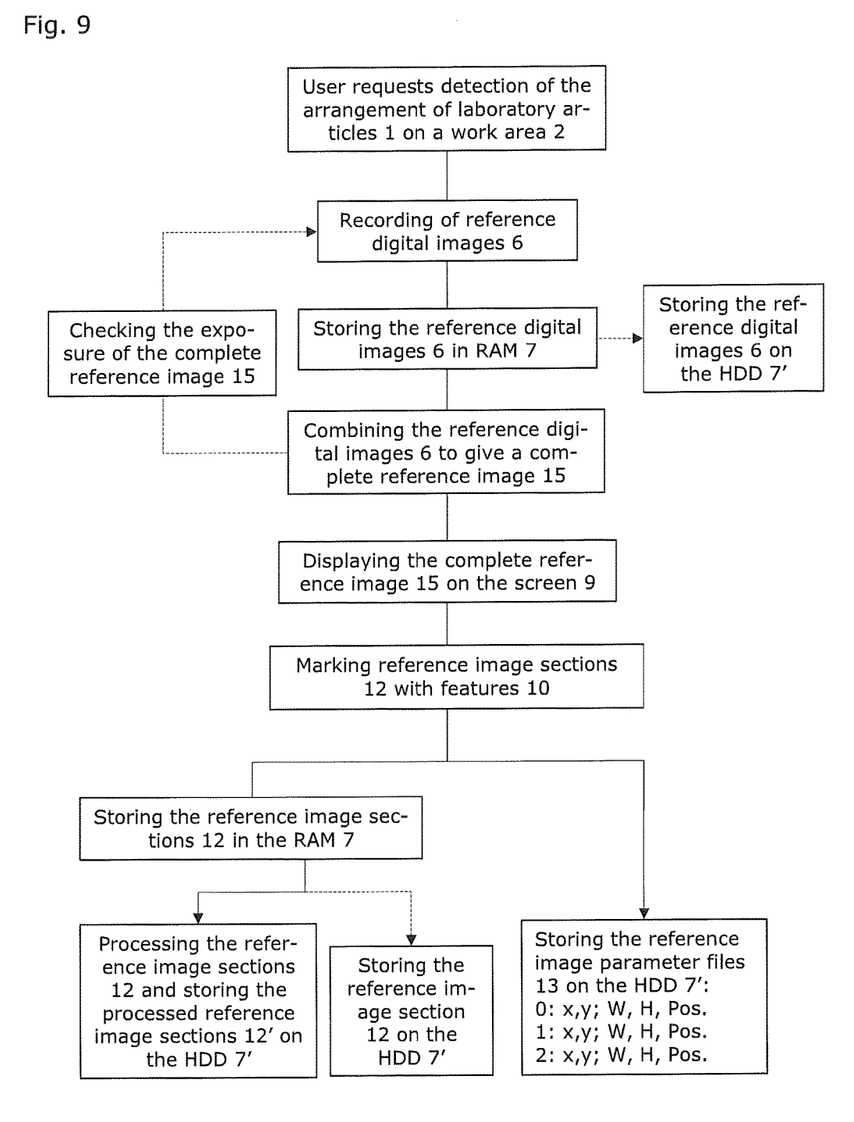
FIG. 9 shows a flow diagram of a preferred embodiment of the detection method.

FIG. 9 shows a flow diagram of a preferred embodiment of the detecting method. It is assumed that the work area 2 of the laboratory work station 3 has been constructed in a desired manner. This structure is detected with the learning program—as soon as the user requests the detection of this arrangement of laboratory articles 1. To this end stripwise reference digital images 6 are recorded with one or two webcams 5,5' as desired. The reference digital images 6 are initially stored in the RAM 7 of the processor 8 (optionally these reference digital images 6 can also be stored in the HDD 7' of the processor 8). The reference digital images 6 are then combined to give a complete reference image 15 (optionally the exposure of the complete reference image 15 is checked and a renewed recording of reference digital images 6 is occasioned). The complete reference image 15 is displayed on the screen 9 so that the reference image sections 12 can be marked by means of characteristic features 10. The reference image sections 12 are then stored in the RAM 7 of the processor 8 (optionally these reference image sections 12 can also be stored in the HDD 7' of the processor 8). Parallel to this the reference image parameter files 13 of the reference image sections 12 are stored on the HDD 7' of the processor 8. The reference image sections 12 are then processed and stored in the HDD 7' of the processor 8. As a result of the detection method, processed reference image sections 12' or unprocessed reference image sections 12 and the corresponding reference image parameter files 13 are stored on the hard disk 7' of the processor 8 and can be retrieved from there.

Figure 10:
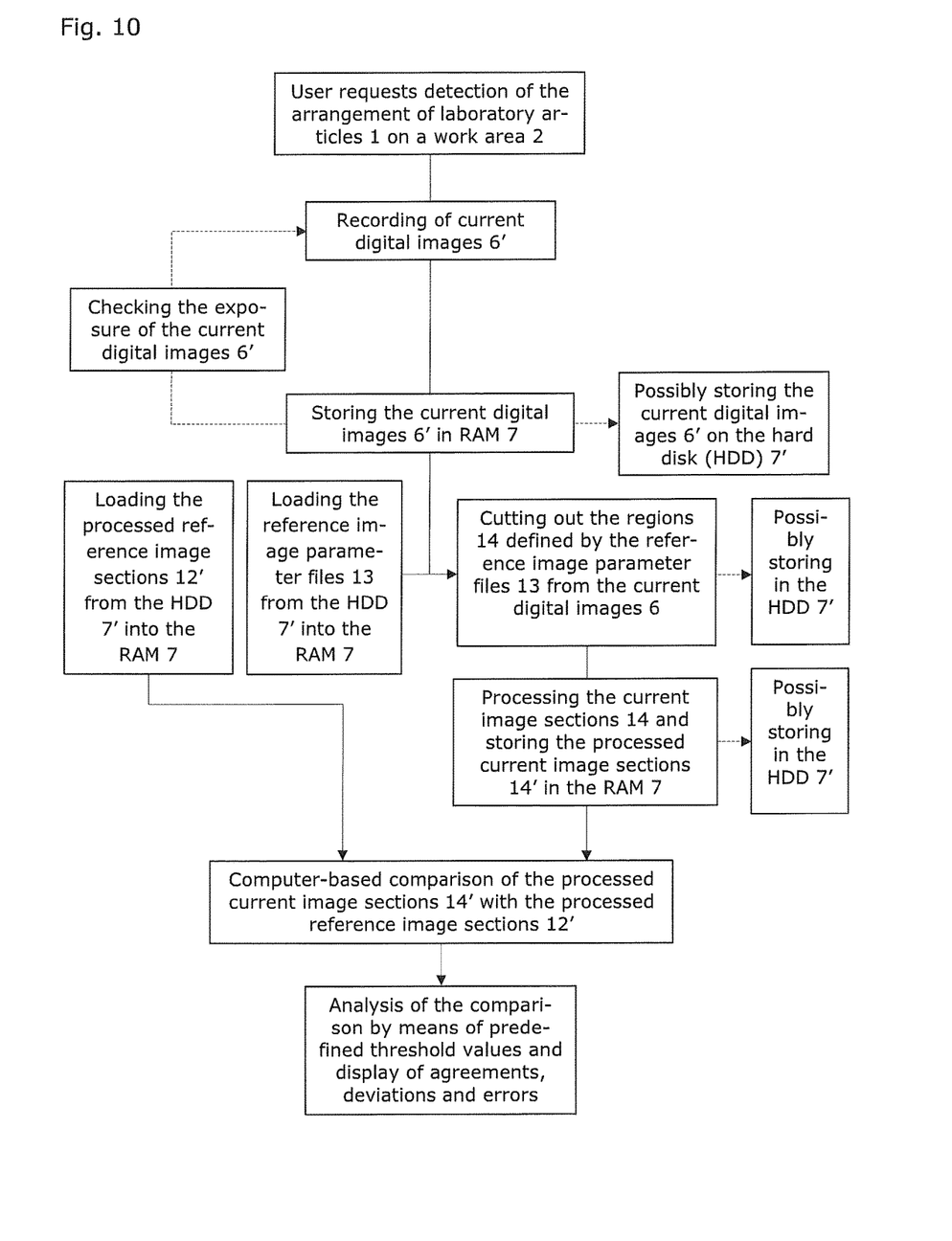
FIG. 10 shows a flow diagram of a preferred embodiment of the checking method.

FIG. 10 shows a flow diagram of a preferred embodiment of the checking method. It is assumed that the work area 2 of the laboratory work station 3 has been constructed previously in the desired manner and has been detected by the learning program. In addition, it is assumed that the originally detected structure of the laboratory articles is retained or at least not substantially changed or that an at least similar structure of the laboratory articles 1 has been made. As soon as the user requests the checking of this current arrangement of laboratory articles 1—this current structure is detected by means of the checking program and compared with the originally detected arrangement of the laboratory articles 1. To this end, stripwise current digital images 6' are recorded from the current work area 2 by means of one or two webcams 5,5' as desired. These current digital images 6' are initially stored in the RAM 7 of the processor 8. Optionally the exposure of the current digital images 6' can be checked and a renewed recording and storage of current digital images 6' can be instigated (optionally the current digital images 6' can also be stored in the HDD 7' of the processor 8). The reference image parameter files 13 stored previously when executing the learning program are retrieved from the hard disk 7' of the processor 8 and also loaded into the RAM 7 of the processor 8. With the aid of these reference image parameter files 13, defined regions or current image section 14 are cut out from the current digital images 6' (optionally these current image sections 14 can be stored in the HDD 7' of the processor 8). The current image sections 14 are then processed and the processed current image sections 14' are stored in the RAM 7 of the processor 8 (optionally these processed current image sections 14' can be stored in the HDD 7' of the processor 8). After the processed reference image sections 12' stored previously when executing the learning program have been loaded from the hard disk 7' into the RAM 7 of the processor 8, a computer-based comparison of the processed current image sections 14' with the processed reference image sections 12' is made. This comparison is analyzed by the checking program and by means of previously defined threshold values, agreements, deviations and errors of the current arrangement of laboratory articles 1 with respect to the original arrangement of laboratory articles 1 on the work area 2 of the laboratory work station 3 are displayed. As a result of the checking method, the user is therefore informed whether the arrangement of laboratory articles 1 can be used or not for the planned experiments which have been carried out successfully with the original arrangement. If only slight deviations could be determined or if unknown objects (such as tools, note blocks, gloves etc.) not present when detecting the original arrangement of laboratory articles 1 are located on the work area 2, a corresponding alarm is given to the user.

For comparison of the processed current image sections 14' with the processed reference image sections 12', the processed image regions are matched with the function cvMatchTemplate with the parameter CV_TM_CCOEFF-_NORMED. By means of the position of optimal matching obtained and the quality value obtained $0 \leq q \leq 1$ (1=perfect agreement), it is now determined whether this is a successful or unsuccessful matching. A matching is successful if the X value differs by less than 3 pixels and the Y value by less than 2 pixels from the expected position and $q \geq 0.650$. This is displayed to the user on an image of the work area 2 by a green rectangle [or rectangle of a first color]. The different tolerances in the X and Y direction are explained by the fact that the X position of the camera is dependent on the precision of the X drive of the robot arm 4 and therefore can possibly deviate somewhat from the actual X value of a carrier 1. The X value of the carrier 1 can only vary, e.g. when using a Freedom EVO® laboratory work station 3 of the applicant, in steps of 2.5 cm when the other parameters remain the same (this distance corresponds to the work area grid=pimple spacing in the X direction). The Y value of the fixedly mounted camera 5 on the other hand should always be exactly the same. The Y values of the carrier can be varied in any small steps because a displacement in the Y direction is possible. An incompletely inserted carrier 1 poses a considerable danger and thus must be more strongly weighted. If only the position values agree whilst the q value is below 0.650, a warning in the form of a yellow rectangle is output.

Providing millimeter data with respect to the resolution that is achievable when assessing a minor misplacement appears to be rather difficult, because the exact resolution directly depends on the position of the camera, on its optic, and on the resolution of its imaging sensor. Additional parameters that also influence resolution are for example the angle that the object takes in relation to the optical axis, the distance between object and camera etc. Even when utilizing a camera with moderate resolution (such as e.g. 640×480 pixels of the webcam employed), misplacements of 1 to 2 mm can be detected, wherein the tolerated deviation preferably in each dimension represents a tunable parameter.

If the position values are exceeded, this is displayed by a red rectangle [or rectangle of a third color]. Depending on the type of exceeding, specific messages could be sent to the user here such as, for example:

in X direction: carrier in wrong grid;
in Y direction: carrier not completely inserted;
in X and Y direction: carrier not correctly in grid When implementing the detection or checking method according to the invention, at least one derivative of the grey-scale images or the images of the red, green or blue channel of a color image in one direction is especially preferred. Preferably each reference grey-scale image 17 and each current grey-scale image 17' is subjected to at least one derivation operation. This derivation operation can optionally be completed in an x direction or in a y direction, although other directions such as, for example 45° can also be selected for the derivation operation. Additionally or alternatively separate derivation operations can be executed in at least one direction for each of the three color levels R (red), G (green) or B (blue).

As described, preferably a first computer program is required for the method for detecting the arrangement of laboratory articles 1 on a work area 2 of a laboratory work station 3 (learning program) and a second computer program is required for the method for checking the arrangement of laboratory articles 1 on a work area 2 of a laboratory work station 3 (checking program). However, it can also be provided to combine both computer programs in a single application program.

All the image processing programs used were programmed under MICROSOFT® Visual Studio 2010 with C++ using the OpenCV-Library (V 2.1) and the ZBar Library (V 0.1). The control scripts for the laboratory work stations 3 were written in Freedom EVOware® V 2.4SP1, Build 2.4.8.0.

The same reference numbers designate the same or at least corresponding features even if these were not described in detail in each case. The choice of an external computer, i.e. a separate processor 8' or the use of the processor 8 of the laboratory work station 3 is preferably up to the user so that he can use one or other processor without departing from the idea of the present invention.

If a person skilled in the art should decide to use an alternative laboratory work station 3 designed and operating according to a polar coordinate system for carrying out the detection and/or checking method according to the invention, in the knowledge of the present invention he will instruct a programming specialist to adapt the method accordingly and for example, to define the reference image parameter file 13 in polar coordinates, i.e. by a center, an angle, and a distance in relation to this center.

| Reference list | | |
|---|---|---|
| 1 | Laboratory article, microplate, carrier, rack | |
| 2 | Work area, first work area | |
| 2' | Second work area | |
| 3 | Laboratory work station | |
| 4,4' | Support apparatus, robot arm | |
| 5,5' | Digital camera, webcam | |
| 6 | Reference digital image (original) | |
| 6' | Current digital image | |
| 7 | First memory (RAM) | |
| 7' | Second memory (HDD) | |
| 8 | Processor of the RSP | |
| 8' | Separate processor | |
| 9 | Screen, image display device | |
| 10 | Characteristic feature | |
| 10' | Features of the work area | |
| 10" | Features of the laboratory article | |
| 10'" | Features of additional markings | |
| 11 | Input device | |
| 12 | Reference image section (original) | |
| 12' | Processed reference image section | |
| 13 | Reference image parameter file (original) | |
| 14 | Current image section | |
| 14' | Processed current image section | |
| 15 | Complete reference image | |
| 15' | Processed complete reference image | |
| 16 | Buffer zone to 14 | |
| 17 | Reference grey-scale image | |
| 17' | Current grey-scale image | |
| 18 | Cross hair | |
| 19 | Optic axis of 5 | |
| 19' | Optic axis of 5' | |

The invention claimed is:

1. Method for detecting and checking an arrangement of laboratory articles (1) on a work area (2) of a laboratory work station (3), wherein at least one support apparatus (4) is disposed above the work area (2) of the laboratory work station (3), and wherein the method comprises the following steps:
   a) detecting an original arrangement of laboratory articles (1) on the work area (2) of the laboratory work station (3) by means of at least one reference digital image (6), wherein the reference digital images (6) are recorded by means of at least one digital camera (5) fastened to the support apparatus (4) in a defined position and alignment;
   b) storing said reference digital image (6) in a first memory of a processor (8,8') operatively connected to the digital camera (5);
   wherein subsequently, the following steps are carried out:
   c) displaying the reference digital image (6) on an image display device (9) operatively connected to the processor (8,8');
   d) selecting and marking of characteristic features (10) of the laboratory work station (3) that are visible on the at least one reference digital image (6) by a user, wherein the features (10) are selected from a group that consists of features of the work area (10'), features of the laboratory articles (10"), and features of additionally applied markings (10'"), and wherein the user utilizes at least one input device (11) operatively connected to the processor (8,8') for marking the characteristic features (10);
   e) drawing of rectangles adapted in their size around the marked features (10) and confirming by the user;
   f) producing reference image sections (12) corresponding to the rectangles around the marked features (10) on the work area (2) of the laboratory work station (3) confirmed by the user in step e);

g) producing at least one reference image parameter file (13) for the reference image sections (12) produced in step f); and
h) storing the reference image sections (12) produced in step f) and the reference image parameter file(s) produced in step g) in a second memory (7'),
wherein the laboratory articles (1) are selected from a group comprising containers in form of microplates and sample tubes, supports for receiving such containers, pipette tips, and/or pipette tip magazines,
wherein the reference image sections (12) are produced as unprocessed reference image sections (12) or as digitally processed reference image sections (12') or an unprocessed complete reference image (15) or a processed complete reference image (15') and respectively corresponding reference image parameter files (13) are produced for the original arrangement of laboratory articles (1) on the work area (2) of this laboratory work stations (3), and wherein the method comprises the further following steps:
i) detecting a current arrangement of laboratory articles (1) on the work area (2) of the laboratory work station (3) by means of at least one current digital image (6'), wherein the current digital images (6') are recorded with a digital camera (5) fastened to the support apparatus (4) in a defined position and alignment;
j) storing this current digital image (6') in the first memory (7) of the processor (8,8') operatively connected to the digital camera (5),
k) loading the processed reference image sections (12') or the processed complete reference image (15') as well as loading the corresponding reference image parameter files (13) from the second memory (7') into the first memory (7) of the processor (8,8');
l) creating the current image sections (14) from the current digital images (6'), wherein these current image sections (14) are defined by X/Y parameters of the reference image parameter files (13);
m) processing the current image sections (14) according to the processed reference image sections (12); and
n) storing the processed current image sections (14') in the first memory (7) of the processor (8, 8').

2. The method of claim 1, wherein displaying said at least one reference digital image (6) on an image display device (9) operatively connected to the processor (8,8') is effected together with requesting the user to mark relatively small, distinctive places which are important for the sequence of planned tests as reference image sections (12).

3. The method of claim 2, wherein the user draws rectangles indicated on the screen adapted in their size around these features (10',10'') or markings (10''') with a computer mouse (11) and confirms the selection with a mouse click or by pressing any previously appointed key, e.g. the enter button, on a computer keyboard.

4. The method of claim 1, wherein the original arrangement of laboratory articles (1) on the work area (2) of the laboratory work station (3) is detected by means of two digital cameras (5,5') which are fastened to the same support apparatus (4) at a distance from one another.

5. The method of claim 1, wherein the original arrangement of laboratory articles (1) on the work area (2) of the laboratory work station (3) is detected by means of two digital cameras (5,5'), wherein these digital cameras (5) are fastened to two different support apparatuses (4,4') arranged at a distance from one another.

6. The method of claim 1, wherein for detection of the original arrangement of laboratory articles (1) on the work area (2) of the laboratory work station (3) the at least one support apparatus (4) with one or two digital cameras (5,5') fastened thereon is moved to at least two recording locations, wherein at each of these recording locations a reference digital image (6) is recorded with each of these digital cameras (5,5').

7. The method of claim 6, wherein the movement of the digital cameras (5,5') to the recording locations and the recording of reference digital images (6) at the recording locations is controlled by a software of the laboratory work station (3).

8. The method of claim 1, wherein each of the reference image parameter files (13) produced in step g) comprises X/Y parameters or polar coordinates of the corresponding reference image section (12).

9. The method of claim 1, wherein the reference digital images (6) are combined to form a complete reference image (15).

10. The method of claim 1, wherein an exposure of the reference digital images (6) or of the complete reference image (15) is checked, whereupon, if the reference digital images (6) or the complete reference image (15) is overexposed or underexposed, one of the following alternative steps is carried out:
the user is requested,
an instruction is issued to a controller,
a command is issued automatically to a controller to detect again the original arrangement of laboratory articles (1) on the work area (2) of the laboratory work station (3).

11. The method of claim 1,
wherein following step i), an exposure of the current digital images (6') is checked, whereupon, if the current digital images (6') are overexposed or underexposed, one of the following alternative steps is carried out:
the user is requested,
an instruction is issued to a controller,
a command is issued automatically to a controller to detect again the original arrangement of laboratory articles (1) on the work area (2) of the laboratory work station (3).

12. The method of claim 1, wherein when creating the current image sections (14) defined by the X/Y parameters or the polar coordinates of the reference image parameter files (13) from the current digital images (6') in step l), a buffer zone (16) surrounding these current image sections (14) is additionally added.

13. The method of claim 12, wherein the current image sections (14') processed in step m) with buffer zone (16) are compared with the processed reference image sections (12') in the processor (8,8') by searching for the corresponding processed reference image section (12') within each processed current image section (14') with buffer zone (16).

14. The method of claim 13, wherein for each feature (10',10'',10''') it is determined by means of result values whether in relation to image content and position of the features (10',10'',10''') agreement exists between the current arrangement of laboratory articles (1) and the original arrangement of laboratory articles (1) on the work area (2) of the laboratory work station (3),
wherein these result values comprise an image content component, a spatial component in the X direction and a spatial component in a Y direction or spatial components corresponding to polar coordinates, and wherein the agreement of each of these at least three components is determined in relation to respectively one corresponding threshold value.

15. The method of claim 14,
wherein each perfect agreement is displayed as an individual field of a first color assigned to the corresponding current image section (14) and each satisfactory agreement is displayed as an individual field of a second color assigned to the corresponding current image section (14) on the image display device (9), and
wherein each error is displayed as an alarm, wherein the alarm is selected from a group consisting of a visual alarm, an audible alarm, an alarm message and a mechanical blocking of the laboratory work station (3).

16. The method of claim 1, wherein a reference grey-scale image (17) is created of every reference image section (12) or complete reference image (15), and wherein each reference grey-scale image (17) of a reference image section (12) or complete reference image (15) and/or each of the three color levels R (red), G (green) or B (blue) of a colored reference image section (12) or complete reference image (15) is subjected to at least one derivation operation.

17. The method of claim 1,
wherein the current image sections (14') processed in step m) are compared with the processed reference image sections (12') in the processor (8,8') by searching for the corresponding processed reference image section (12') within each processed current image section (14').

18. The method of claim 17, wherein for each feature (10',10'',10'') it is determined by means of result values whether in relation to image content and position of the features (10',10'',10'') agreement exists between the current arrangement of laboratory articles (1) and the original arrangement of laboratory articles (1) on the work area (2) of the laboratory work station (3), wherein these result values comprise an image content component, a spatial component in the X direction and a spatial component in a Y direction or spatial components corresponding to polar coordinates, and wherein the agreement of each of these at least three components is determined in relation to respectively one corresponding threshold value.

19. The method of claim 18, wherein each perfect agreement is displayed as an individual field of a first color assigned to the corresponding current image section (14) and each satisfactory agreement is displayed as an individual field of a second color assigned to the corresponding current image section (14) on the image display device (9), and wherein each error is displayed as an alarm, wherein the alarm is selected from a group consisting of a visual alarm, an audible alarm, an alarm message and a mechanical blocking of the laboratory work station (3).

20. Laboratory work station (3) comprising at least one work area (2), wherein the laboratory work station (3) further comprises:
o) at least one support apparatus (4) disposed above the work area (2) of the laboratory work station (3);
p) at least one digital camera (5, 5') fastened to the support apparatus (4) in a defined position and alignment;
q) a processor (8) operatively connected to the at least one digital camera (5) with a first and second memory (7,7');
r) an image display device (9) operatively connected to the processor (8);
s) at least one input device (11) operatively connected to the processor (8); and
t) a computer program which can be activated in the processor (8) for carrying out the method of detecting and checking an arrangement of laboratory articles (1) on this work area (2) of the laboratory work station (3) according to claim 1.

21. The laboratory work station (3) of claim 20,
wherein the work area (2) is defined by an X axis and a Y axis running at right angles thereto,
wherein the laboratory work station (3) comprises a Z axis running perpendicular to the work area (2), and
wherein the at least one support apparatus (4) with digital camera fastened thereon is configured to be linearly movable in the direction of the X axis or Y axis.

* * * * *